US012743542B2

(12) United States Patent
French et al.

(10) Patent No.: US 12,743,542 B2
(45) Date of Patent: Sep. 22, 2026

(54) ENCRYPTING EXISTING DATABASES WITH ZERO DOWNTIME AND ZERO STORAGE OVERHEAD

(71) Applicant: INTERNATIONAL BUSINESS MACHINES CORPORATION, Armonk, NY (US)

(72) Inventors: Alexander French, Toronto (CA); Walid Rjaibi, Markham (CA); Kirby Chin, Richmond Hill (CA); Kamran Mirshahi, Holland Landing (CA); Junseo Hwang, London (CA)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 18/966,309

(22) Filed: Dec. 3, 2024

(65) Prior Publication Data

US 2026/0154442 A1 Jun. 4, 2026

(51) Int. Cl.

| | |
|---|---|
| ***G06F 21/00*** | (2013.01) |
| ***G06F 21/60*** | (2013.01) |
| ***G06F 21/62*** | (2013.01) |

(52) U.S. Cl.

CPC ........ *G06F 21/6227* (2013.01); *G06F 21/602* (2013.01)

(58) Field of Classification Search

CPC ........................... G06F 21/6227; G06F 21/602

See application file for complete search history.

(56) References Cited

U.S. PATENT DOCUMENTS

| | | | | |
|---|---|---|---|---|
| 5,717,919 | A * | 2/1998 | Kodavalla | G06F 16/2282 |
| 8,122,196 | B2 * | 2/2012 | Chang | G06F 21/602 713/189 |
| 8,171,307 | B1 | 5/2012 | Chang | |
| 8,477,932 | B1 | 7/2013 | Plotkin et al. | |
| 8,522,041 | B2 | 8/2013 | Hsu et al. | |

(Continued)

FOREIGN PATENT DOCUMENTS

| | | | |
|---|---|---|---|
| CN | 115599872 | A | 1/2023 |
| KR | 10-2009-0067342 | A | 6/2009 |

OTHER PUBLICATIONS

"CipherTrust Live Data Transformation Zero-Downtime Encryption and Key Rotation", Thales, Sep. 2022, 2 pages.

(Continued)

*Primary Examiner* — Kendall Dolly

(74) *Attorney, Agent, or Firm* — Teddi E. Maranzano

(57) ABSTRACT

Systems, methods are provided for encrypting, decrypting, re-encrypting an existing database with neither downtime nor storage overhead. Create a list of tables to be processed. Identify status of each table by an indicator in a database catalog. Store a second status in each data page. Select a table to process from list of tables. Issue a table lock against the selected table. Select a configurable number of data pages to process during the duration of the table lock. Following the processing, flush the data pages to storage. If there are no more data pages to encrypt for the selected table, remove the selected table from the list of tables to be processed. Release the table lock. If there are more data pages to process in the selected table, and there are waiters for the selected table, release the table lock; select another table from the list of tables to process.

20 Claims, 2 Drawing Sheets

(56) References Cited

U.S. PATENT DOCUMENTS

| | | | | |
|---|---|---|---|---|
| 10,659,225 | B2 * | 5/2020 | Surla | H04L 9/0894 |
| 11,188,674 | B2 | 11/2021 | Dageville et al. | |
| 11,537,724 | B2 | 12/2022 | Kaul et al. | |
| 2007/0299843 | A1 | 12/2007 | Deshpande | |
| 2014/0188821 | A1 | 7/2014 | Zhou et al. | |
| 2015/0310221 | A1 | 10/2015 | Lietz et al. | |
| 2018/0032447 | A1 | 2/2018 | Kaplan et al. | |
| 2019/0392166 | A1 * | 12/2019 | Awad | G06F 21/6281 |
| 2023/0008874 | A1 * | 1/2023 | Stabrawa | G06F 9/45558 |
| 2024/0134840 | A1 | 4/2024 | Kong et al. | |
| 2024/0184766 | A1 | 6/2024 | Ng et al. | |

OTHER PUBLICATIONS

“Data Encryption and Rekeying Made Easy”, Entrust-Securing a world in motion, 2022, 9 pages.

“Database Administrator’s Guide”, Oracle, retrieved from web dated Jan. 10, 2025, 80 pages.

“Oracle Advanced Security, Transparent Data Encryption (TDE)”, Oracle Database, Mar. 2018, 10 pages.

Rjaibi Walid. “Holistic Database Encryption”, IBM Canada Lab, 8200 Warden Avenue, Markham, Ontario, Canada, 2018, 6 pages.

International Searching Authority, “Notification of Transmittal of the International Search Report and the Written Opinion of the International Searching Authority, or Declaration,” Patent Cooperation Treaty, Apr. 29, 2026, 6 pages, International Application No. PCT/IB2025/062269.

* cited by examiner

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

ENCRYPTING EXISTING DATABASES WITH ZERO DOWNTIME AND ZERO STORAGE OVERHEAD 150

PERIPHERAL DEVICE SET 114

UI DEVICE SET 123

STORAGE 124

IoT SENSOR SET 125

NETWORK MODULE 115

END USER DEVICE 103

WAN 102

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

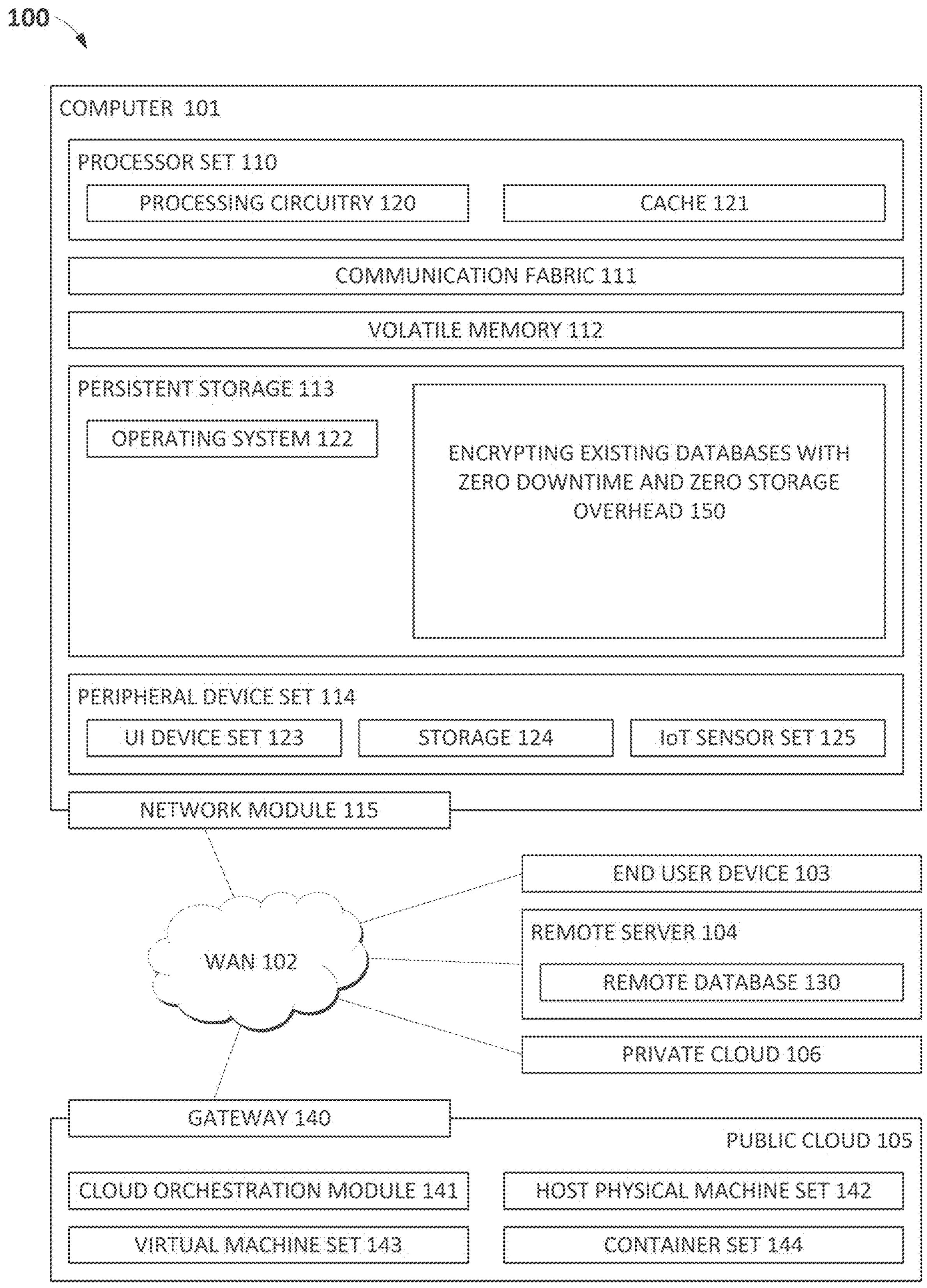

FIG. 1

ENCRYPTING EXISTING DATABASES WITH ZERO DOWNTIME AND ZERO STORAGE OVERHEAD

BACKGROUND

This invention relates generally to computer systems, and more particularly to encrypting databases.

Databases are encrypted to secure the data stored within them from unauthorized access, and to meet various national and international security compliance mandates. Within the database, encryption can be done at various levels, for example row level, column level, or table level. The most optimal encryption level to allow organizations to avoid making compromises on either security or efficiency is holistic database encryption, where the entire database is encrypted as a whole.

Holistic database encryption is efficient for newly created databases since the data can be encrypted as part of the load process. However, enabling holistic database encryption for existing databases requires storage overhead during which the database is copied, and downtime during which the encryption occurs. Therefore, the impact, inconvenience, and expense negatively impact the business applications, since there is a period, at least during the backup and restore operations, where the database is unavailable to service requests.

It would be advantageous to provide a method for encrypting a database that neither requires downtime nor incurs storage overhead, thereby maintaining the customer's required performance, integrity, and availability service levels.

SUMMARY

Systems and methods are provided for encrypting, decrypting, and re-encrypting an existing database without downtime and without storage overhead. A list of tables to be processed is created. A status of each table is identified by an indicator in a database catalog. A second status is stored in each data page. A table to process is selected from the list of tables and a table lock is issued against the selected table. A configurable number of data pages is selected to process during the duration of the table lock. Following the processing, the data pages are flushed to storage. Based on there being no more data pages to encrypt for the selected table, the selected table is removed from the list of tables to be processed and release the table lock. If there are more data pages to process in the selected table, and there are waiters for the selected table, release the table lock and select another table from the list of tables to process.

BRIEF DESCRIPTION OF THE SEVERAL VIEWS OF THE DRAWINGS

Embodiments are further directed to computer systems and computer program products having substantially the same features as the above-described computer-implemented method.

FIG. 1 illustrates the operating environment of a computer server embodying a system for encrypting existing databases with zero downtime and zero storage overhead.

DETAILED DESCRIPTION OF THE INVENTION

Figure 2:
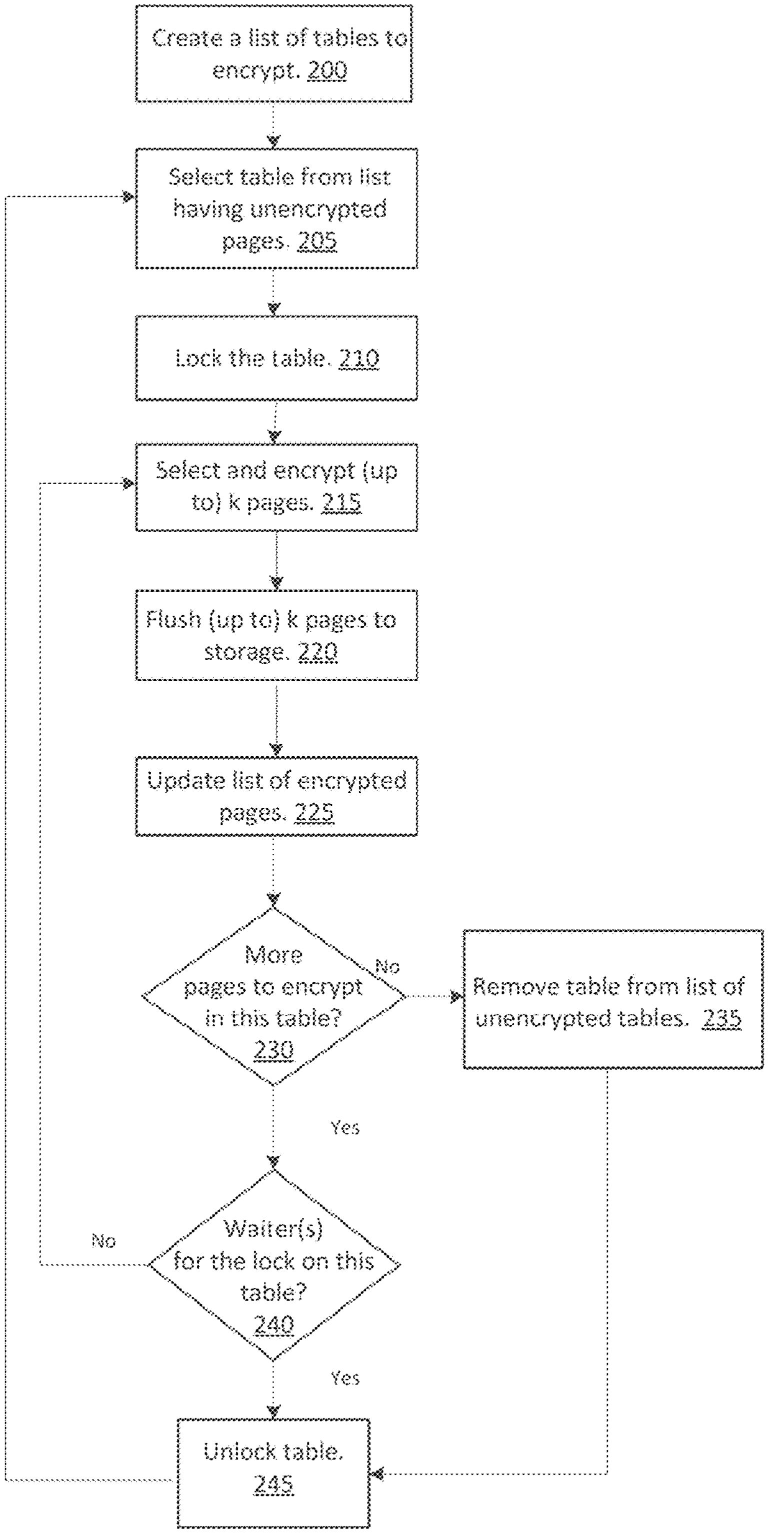
FIG. 2 illustrates an exemplary flow chart for encrypting existing databases with zero downtime and zero storage overhead.

Organizations encrypt their databases to secure their proprietary data and to satisfy compliance mandates including the General Data Protection Regulation (GDPR), Health Insurance Portability and Accountability Act (HIPAA), Payment Card Industry Data Security Standard (PCI DSS), and others. The encryption can be implemented at many levels, such as the filesystem in which the data is stored, and the logical structures used to organize the data such as the row, column, and table. These options lack uniformity in their implementation, since the owners of the data can choose what level, if any, of security they wish to use. While they may provide flexibility in the level of data to be encrypted, this level of granularity is accompanied by degraded performance. Additionally, some of these options can degrade query performance and impose limitations on some features. For example, encrypting foreign or primary keys may be restricted, and the greater the number of columns encrypted, the greater the negative performance impact since the columns have to be decrypted/encrypted depending on the SQL queries. While disk or filesystem level security may seem like a more comprehensive encryption alternative, disk/filesystem encryption level can be breached if a hacker compromises the operating system and gains at least read access to the data stored within it.

To ensure security, compliance, and consistency, the database should be encrypted as a whole. Whole database encryption is easily implemented for newly created databases since the data is encrypted as it is being loaded. However, for existing databases, enabling whole database encryption requires the organization to incur some amount of down time during which the database is unavailable to service application requests. This is because as currently practiced, whole database encryption involves making a backup of the database and then restoring the backup into a new database with encryption enabled. In addition to being unavailable to respond to the organization's applications, this method incurs the additional storage overhead equal to the size of the original database. Even if only temporary, this additional storage can be costly for resource constrained organizations.

A review of the literature in this space shows some methods for encrypting a database incrementally but each suffers from either a storage overhead or does not completely eliminate the need for a downtime.

For example, one known implementation provides for encrypting an existing database with column or level encryption. While this method may allow for the database to remain accessible for application queries during the encryption process, this method makes a duplicate copy of the table being encrypted, thereby requiring twice the storage of the original table. The greater the number of columns or rows being encrypted, the greater the potential for performance impact, since the data has to be decrypted/encrypted in response to the SQL queries. Other known implementations require some downtime to configure and install agents, or to block users from arbitrary data blocks while they are being encrypted.

Other specialized implementations include high availability configurations, where database encryption is provided by creating and manipulating the relationship of the active and standby databases, thereby maintaining user access. Dropping the existing tablespaces and reloading and recreating them using encryption is still required, as is installing specialized product software to manage the entire process.

The number and complexity of the operations required to implement the encryption may tend to be error prone.

Embodiments of the present invention address the shortcomings of the currently practiced techniques, thereby requiring neither downtime nor additional storage to perform whole database encryption. These embodiments can be integrated into any existing database system (DBMS). By progressively encrypting the database tables in an intelligent manner, the entire database is encrypted by the end of the encryption process.

During the encryption process, only a small amount of data is encrypted at a time. This means that when an application needs access to the table that is currently being encrypted, the application can likely gain access quickly. This is because the portion of data being encrypted is protected by an exclusive table lock, which is a construct inherent in the database architecture. Once the encryption of that portion of data is completed, the table lock is released. The amount of data being encrypted each time can be configured as a "k" number of pages. Therefore, the duration of the lock can be refined by the configuration value. Additionally, the manner of selecting the data to encrypt tends to make the likelihood that an application would need access to a table currently being encrypted low because tables with low or no activity are selected.

The database system code is extended to include a background process which is executed upon invoking a privileged administrative command, for example:

("alter Database <database-name> Set Encryption Using <encryption-algorithm>, <key-size>."

To support applications accessing the database concurrently with the encryption process, both the read and write operations must respect the table lock and cross reference the list of encrypted pages and tables to verify whether the data already exists in storage as plaintext, or whether it should be decrypted prior to use.

Turning now to FIG. 1, a block diagram of a computing environment 100 for providing a system for encrypting existing databases with zero down time and zero storage overhead (system) 150 is generally shown in accordance with one or more embodiments of the present invention. These embodiments can be integrated into any DBMS, such as IBM® DB2® or Oracle® Database (IBM and DB2 are registered trademarks of IBM in the United States. Oracle Database is a registered trademark of Oracle Corporation).

Computing environment 100 contains an example of an environment for the execution of at least some of the computer code involved in performing the inventive methods of system 150.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, an administrator that operates computer 101), and may take any of the forms discussed above in connection with computer 101. For example, EUD 103 can be the external application by which an end user connects to the control node through WAN 102. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring now to FIG. 2, an exemplary flow chart for encrypting existing databases with zero DBMS downtime and zero storage overhead is shown.

Beginning at 200, the system creates a list of tables to be encrypted from the DBMS. This list can be built by examining the system catalog, or data dictionary, for each database in the DBMS, because the system catalog tables can be queried using structured query language (SQL) similar to being able to query any other table in the database. The system catalog structure contains the definitions and properties for each table, view, and other database object, including encryption status. The encryption status may represent the status of the table, view, or object as a whole. A second encryption status may be stored separately with each data page associated with a table, such as a flag indicating whether the individual page is, or has yet to be, encrypted. The system 150 will subsequently query the page-level flag to monitor encryption progress over time.

After creation, where to store the list of tables is implementation dependent. However, to prevent the list of tables from having to be recreated each time the database is activated, the list of tables is optimally preserved in permanent storage. For DB2, for example, the list of tables may be stored as another database configuration file, where such parameters as database code page, collating sequence, state (e.g., backup pending indicator), and buffer pool size are stored, among other parameters. The system 150 will use the page-level flag of each page in each table in the list of tables to monitor and update progress. Therefore, when the system 150 is deactivated, the current encryption status is maintained.

At 205 the system 150 selects a table from the list of tables to begin encrypting. In an embodiment, the system 150 looks at the data pages in the database buffer pool. Because the data pages from a table which was recently used by a query will be in the database buffer pool, the system 150 can also preferentially choose tables which are not in the database buffer pool. This is to avoid selecting tables which were recently used, and therefore may be used again soon in the future. Other embodiments include using performance measurement tools, either those native to the particular DBMS or any available 3rd party monitor, to select which tables are least used in a given database, thereby prioritizing these tables for encrypting.

At 210 the system 150 issues a standard SQL request for an exclusive table lock for the table selected for encryption. If the table is already locked, the system 150 may take a default action, such as waiting or retrying the request, depending on the DBMS architecture. Alternatively, the system 150 may proceed to the next table in the list of tables, and return to the locked table later.

At 215 the system 150 selects the next "k" number of unencrypted pages, where "k">="1". The "k" number affects the duration of the table lock, since the smaller value, the shorter the time the table is locked. Factors such as collected performance measurements, table activity, and table size can be used to configure the optimal "k" number. Other possible embodiments include using heuristics, histograms, or artificial intelligence (AI) modeling to select tables which are least used in a given database.

How each page in the database buffer pool is uniquely identified and associated with a particular table depends on the DBMS architecture, but minimally includes a unique page identifier. The data page may further include a header, and additional status indicators including whether the data page is encrypted. Each of the "k" number of data pages is encrypted using the DBMS encryption algorithm and key length as specified on the "ALTER DATABASE" statement. The encryption is performed by the system 150 invoking the DBMS encryption algorithm. For example, in DB2, the DBMS encryption algorithm is DB2 native encryption.

At 220, following encryption, each of the "k" number of data pages is flushed to permanent storage.

If at 230 there are no more data pages to encrypt for this table, at 235 the system 150 removes the table from the list of tables, and resets (clears) the table encryption status in the DBMS catalog, and releases the table lock (245).

If at 230 there are more data pages to encrypt for this table, the system 150 tests if there are waiters on this table. If there are waiters, the system 150 releases the table lock (245). This allows any consumer which may be waiting for the table to gain access quickly, since the wait will be for "k" pages at most, rather than for the entire table. The system 150 returns to 205 to select another table from the list of tables.

If at 240 there are no waiters for this table, the system 150 returns to 215 to select the next "k" number of unencrypted pages to encrypt. Processing continues, as above until all data pages of all tables are encrypted.

As an example, consider a use case where a hospital has a database called HOSPITAL that contains multiple tables such as CLIENTS, PRESCRIPTIONS, VISITS. The hospital needs to read from and write to tables from the HOSPITAL database on a 24/7 schedule and cannot afford a downtime to their database system to encrypt their data. Furthermore, the CLIENTS table is very large so encryption will take a long time and could have significant overhead if using a solution that duplicates the data. Encrypting the database with zero downtime and zero overhead is achieved by executing the administrative SQL command "ALTER DATABASE HOSPITAL SET ENCRYPTION USING AES, 256". This begins a background process whereby the entire HOSPITAL database is encrypted holistically using advanced encryption standard (AES) 256 with zero downtime and zero storage overhead.

In another embodiment, the "ALTER DATABASE" command may be modified to accept decrypting and re-encrypting operands in addition to the encrypting operand. For example, decrypting may be wanted if new hardware having encryption built in is installed. In that case, the table encryption is redundant and less secure than the hardware level encryption. In each of these cases, the system 150 performs the algorithm of FIG. 2, executing the database encryption algorithm and setting and unsetting table-level and page-level flags according to the function being executed. In another embodiment, the system 150 may re-encrypt tables and data pages using another encryption key, for example changing from AES 128 to AES 256 for increased security. In that case, substitute the new AES key length of "256" in the SQL "ALTER DATABASE" command.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
- creating a list of tables to be encrypted, wherein a status of a table to be encrypted is identified by an indicator in a database catalog, and a second status is stored in each data page;
- selecting a table to encrypt from the list of tables, wherein a table lock is issued against the selected table to encrypt;
- selecting a configurable number of data pages to encrypt during a duration of the table lock;
- flushing the configurable number of data pages to storage following the processing encrypting of the configurable number of data pages;
- based on there being no more data pages to encrypt for the selected table, removing the selected table from the list of tables to be encrypted and releasing the table lock.

2. The method of claim 1, wherein the list of tables is preserved in permanent storage between system activations.

3. The method of claim 1, wherein encrypting the table comprises encrypting the configurable number of data pages.

4. The method of claim 1, wherein encrypting the table comprises decrypting the selected table.

5. The method of claim 1, wherein encrypting the table comprises re-encrypting the selected table by re-encrypting the configurable number of data pages.

6. The method of claim 1, wherein the table to encrypt is selected based on data pages belonging to the table not being in a database buffer pool.

7. The method of claim 1, further comprising:

based on there being more data pages to encrypt in the selected table, and there being waiters to access the selected table, releasing the table lock; and select another table from the list of tables to encrypt.

8. A computer program product, the computer program product comprising one or more computer-readable storage media having program code embodied therewith, the program code, when executed by a processor of a computer to perform a method, the method comprising:

creating a list of tables to be encrypted, wherein a status of a table to be encrypted is identified by an indicator in a database catalog, and a second status is stored in each data page;

selecting a table to encrypt from the list of tables, wherein a table lock is issued against the selected table to encrypt;

selecting a configurable number of data pages to encrypt during a duration of the table lock;

flushing the configurable number of data pages to storage following the encrypting of the configurable number of data pages;

based on there being no more data pages to encrypt for the selected table, removing the selected table from the list of tables to be encrypted and releasing the table lock.

9. The computer program product of claim 8, wherein the list of tables is preserved in permanent storage between system activations.

10. The computer program product of claim 8, wherein encrypting the table comprises encrypting the configurable number of data pages.

11. The computer program product of claim 8, wherein encrypting the table comprises decrypting the selected table.

12. The computer program product of claim 8, wherein encrypting the table comprises re-encrypting the selected table by re-encrypting the configurable number of data pages.

13. The computer program product of claim 8, wherein the table to encrypt is selected based on data pages belonging to the table not being in a database buffer pool.

14. A computer system the computer system, comprising:

one or more processors;

a memory coupled to at least one of the processors;

a set of computer program instructions stored in the memory and executed by at least one of the processors in order to perform actions of:

creating a list of tables to be encrypted, wherein a status of a table to be encrypted is identified by an indicator in a database catalog, and a second status is stored in each data page;

selecting a table to encrypt from the list of tables, wherein a table lock is issued against the selected table to encrypt;

selecting a configurable number of data pages to encrypt during a duration of the table lock;

flushing the configurable number of data pages to storage following the encrypting of the configurable number of data pages;

based on there being no more data pages to encrypt for the selected table, removing the selected table from the list of tables to be encrypted and releasing the table lock.

15. The computer system of claim 14, wherein the list of tables is preserved in permanent storage between system activations.

16. The computer system of claim 14, wherein encrypting the table comprises encrypting the configurable number of data pages.

17. The computer system of claim 14, wherein encrypting the table comprises decrypting the selected table.

18. The computer system of claim 14, wherein encrypting the table comprises re-encrypting the selected table by re-encrypting the configurable number of data pages.

19. The computer system of claim 14, wherein the table to encrypt is selected based on data pages belonging to the table not being in a database buffer pool.

20. The computer system of claim 14, further comprising:

based on there being more data pages to encrypt in the selected table, and there being waiters to access the selected table, releasing the table lock; and selecting another table from the list of tables to encrypt.

* * * * *